United States Patent
Laselva et al.

(10) Patent No.: US 12,375,944 B2
(45) Date of Patent: Jul. 29, 2025

(54) DISCONTINUOUS RECEPTION CONFIGURATION FOR MULTI-BEAM OPERATIONS

(71) Applicant: Nokia Technologies Oy, Espoo (FI)

(72) Inventors: Daniela Laselva, Klarup (DK); Frank Frederiksen, Klarup (DK); Ziqi Liu, Beijing (CN); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 398 days.

(21) Appl. No.: 18/010,366

(22) PCT Filed: Jun. 16, 2020

(86) PCT No.: PCT/CN2020/096434
§ 371 (c)(1),
(2) Date: Dec. 14, 2022

(87) PCT Pub. No.: WO2021/253248
PCT Pub. Date: Dec. 23, 2021

(65) Prior Publication Data
US 2023/0269601 A1  Aug. 24, 2023

(51) Int. Cl.
*H04W 16/28* (2009.01)
*H04W 52/02* (2009.01)
*H04W 72/23* (2023.01)

(52) U.S. Cl.
CPC ....... *H04W 16/28* (2013.01); *H04W 52/0232* (2013.01); *H04W 72/23* (2023.01)

(58) Field of Classification Search
CPC ..... H04L 5/001; H04L 5/0098; H04L 5/0051; H04W 72/231; H04W 52/365;
(Continued)

(56) References Cited

U.S. PATENT DOCUMENTS

| 2019/0053153 A1 | 2/2019 | Islam et al. |
| 2019/0053162 A1 | 2/2019 | Islam et al. |

(Continued)

FOREIGN PATENT DOCUMENTS

| CN | 108282902 A | 7/2018 |
| CN | 109842471 A | 6/2019 |

(Continued)

OTHER PUBLICATIONS

"New WID: UE Power Saving in NR", 3GPP TSG RAN Meetings #84, RP-191607, Agenda Item: 9.4.6, CATT, Jun. 3-6, 2019, 5 pages.

(Continued)

*Primary Examiner* — Jung-Jen Liu
(74) *Attorney, Agent, or Firm* — Lippes Mathias LLP

(57) ABSTRACT

Example embodiments of the present disclosure relate to discontinuous reception configuration for multi-beam operations. A method includes receiving, at a first device and from a second device, configuration information indicating a first plurality of configuration settings associated with a plurality of transmission beams of the second device, the first plurality of configuration settings at least including a first plurality of scrambling identifiers. The method also includes in accordance with a determination that a first transmission beam of the plurality of transmission beams is configured for the first device as a serving beam, selecting, from the first plurality of scrambling identifiers, a first scrambling identifier associated with the first transmission beam. The method further includes monitoring for first control information transmitted by the second device via the first transmission beam using the first scrambling identifier, the first control information indicating presence of data to be transmitted by the second device.

31 Claims, 5 Drawing Sheets

(58) Field of Classification Search
CPC ... H04W 76/15; H04W 52/242; H04W 52/08; H04W 72/0446; H04W 72/23; Y02D 30/70; H04B 7/0617; H04B 7/0404
See application file for complete search history.

(56) References Cited

U.S. PATENT DOCUMENTS

| | | | |
|---|---|---|---|
| 2019/0053320 | A1 | 2/2019 | Islam et al. |
| 2019/0387572 | A1 | 12/2019 | Nam et al. |
| 2020/0008261 | A1 | 1/2020 | Islam et al. |
| 2020/0037248 | A1 | 1/2020 | Zhou et al. |
| 2020/0037396 | A1 | 1/2020 | Islam et al. |
| 2020/0092814 | A1 | 3/2020 | Zhou et al. |
| 2023/0122848 | A1* | 4/2023 | Kim .............. H04L 5/001 455/522 |
| 2023/0362947 | A1* | 11/2023 | Zhang ............ H04W 52/242 |
| 2024/0430968 | A1* | 12/2024 | Kim ............... H04W 76/19 |

FOREIGN PATENT DOCUMENTS

| | | |
|---|---|---|
| CN | 110661606 A | 1/2020 |
| CN | 110999178 A | 4/2020 |
| CN | 111034280 A | 4/2020 |
| CN | 111148192 A | 5/2020 |
| WO | 2018/128455 A1 | 7/2018 |
| WO | 2019/028825 A1 | 2/2019 |
| WO | 2019/083341 A1 | 5/2019 |
| WO | 2020/037319 A1 | 2/2020 |
| WO | 2020/047080 A1 | 3/2020 |
| WO | WO 2020/088940 A1 | 5/2020 |

OTHER PUBLICATIONS

"3rd Generation Partnership Project; Technical Specification Group Radio Access Network; NR; Multiplexing and channel coding (Release 16)", 3GPP TS 38.212, V16.0.0, Dec. 2019, pp. 1-145.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"New WID: UE Power Saving Enhancements", 3GPP TSG RAN Meeting #86, RP-193239, Agenda Item: 9.1.2, MediaTek Inc., Dec. 9-12, 2019, 5 pages.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

IEEE 802.11, Wikipedia, Retrieved on Apr. 5, 2024, Webpage available at : https://en.wikipedia.org/wiki/IEEE_802.11.

"3rd Generation Partnership Project; Technical Specification Group Radio Access Network; NR; Physical layer procedures for control (Release 16)", 3GPP TS 38.213, V16.1.0, Mar. 2020, pp. 1-156.

Office Action received for corresponding Japanese Patent Application No. 2022-577500, dated Dec. 26, 2023, 7 pages of Office Action and 7 pages of summary and translation available.

Extended European Search Report received for corresponding European Patent Application No. 20941205.5, dated Mar. 12, 2024, 9 pages.

Office Action received for corresponding Japanese Patent Application No. 2022-577500, dated Aug. 8, 2024, 2 pages of Office Action and 3 pages of summary and translation available.

ETRI, "Views on DMRS for NR-PDCCH," 3GPP TSG RAN WG1 Meeting #90, R1-1713812, Prague, P.R. Czechia, Aug. 21-25, 2017.

"3rd Generation Partnership Project; Technical Specification Group Radio Access Network; Study on low-power wake-up signal and receiver for NR (Release 18)", 3GPP TR 38.869 V18.0.0, Dec. 2023, pp. 1-261.

"New WID: Low-power wake-up signal and receiver for NE (LPWUS/WUR)", 3GPP TSG RAN Meeting #102, RP-234056, Agenda: 9.1.1.6, CMCC, Dec. 11-15, 2023, pp. 1-6.

Office Action received for corresponding Chinese Patent Application No. 202080104062.0, dated Feb. 28, 2025, 10 pages of Office Action and No. page of translation available.

* cited by examiner

DISCONTINUOUS RECEPTION CONFIGURATION FOR MULTI-BEAM OPERATIONS

CROSS REFERENCE TO RELATED APPLICATION

This patent application is a U.S. National Stage application of International Patent Application Number PCT/CN2020/096434 filed Jun. 16, 2020, which is hereby incorporated by reference in its entirety.

FIELD

Embodiments of the present disclosure generally relate to the field of telecommunication and in particular, to methods, devices, apparatuses and computer readable storage medium for discontinuous reception configuration for multi-beam operations.

BACKGROUND

With development of communication systems, more and more technologies have been proposed. For example, a new radio access system, which is also called a NR system or NR network, is being developed. In order to overcome propagation losses at higher frequency bands and to increase coverage at lower frequency bands, some communications systems are configured with directional beamformed transmission (and reception) using a (large) number of antennas between communication devices. In addition, discontinuous reception (DRX) is a technology for reducing battery consumption by allowing a communication device to discontinuously receive information from another communication device. For example, when the DRX is configured, a receiver (e.g., a terminal device) can wake up occasionally to monitor a channel from a network device so as to reduce the battery consumption.

SUMMARY

In general, example embodiments of the present disclosure provide a solution for DRX configuration for multi-beam operations. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the device to receive, from a second device, configuration information indicating a first plurality of configuration settings associated with a plurality of transmission beams of the second device, the first plurality of configuration settings at least comprising a first plurality of scrambling identifiers; in accordance with a determination that a first transmission beam of the plurality of transmission beams is configured for the first device as a serving beam, select, from the first plurality of scrambling identifiers, a first scrambling identifier associated with the first transmission beam; and monitor for first control information transmitted by the second device via the first transmission beam using the first scrambling identifier, the first control information indicating presence of data to be transmitted by the second device.

In a second aspect, there is provided a second device. The second device comprises at least one processor; and at least one memory including computer program code; where the at least one memory and the computer program code are configured to, with the at least one processor, cause the device to transmit, to a first device, configuration information indicating a first plurality of configuration settings associated with a plurality of transmission beams of the second device, the first plurality of configuration settings at least comprising a first plurality of scrambling identifiers; in accordance with a determination that a first transmission beam of the plurality of transmission beams is configured for the first device as a serving beam, generate first control information by scrambling the first control information with a first scrambling identifier of the first plurality of scrambling identifiers associated with the first transmission beam, the first control information indicating presence of data to be transmitted by the second device; and transmit the first scrambled control information to the first device via the first transmission beam.

In a third aspect, there is provided a method. The method comprises receiving, at a first device and from a second device, configuration information indicating a first plurality of configuration settings associated with a plurality of transmission beams of the second device, the first plurality of configuration settings at least comprising a first plurality of scrambling identifiers. The method also comprises in accordance with a determination that a first transmission beam of the plurality of transmission beams is configured for the first device as a serving beam, selecting, from the first plurality of scrambling identifiers, a first scrambling identifier associated with the first transmission beam. The method further comprises monitoring for first control information transmitted by the second device via the first transmission beam using the first scrambling identifier, the first control information indicating presence of data to be transmitted by the second device.

In a fourth aspect, there is provided a method. The method comprises transmitting, at a second device and to a first device, configuration information indicating a first plurality of configuration settings associated with a plurality of transmission beams of the second device, the first plurality of configuration settings at least comprising a first plurality of scrambling identifiers; in accordance with a determination that a first transmission beam of the plurality of transmission beams is configured for the first device as a serving beam, generating first control information by scrambling the first control information with a first scrambling identifier of the first plurality of scrambling identifiers associated with the first transmission beam, the first control information indicating presence of data to be transmitted by the second device; and transmitting the first scrambled control information to the first device via the first transmission beam.

In a fifth aspect, there is provided a first apparatus. The first apparatus comprises means for receiving, from a second apparatus, configuration information indicating a first plurality of configuration settings associated with a plurality of transmission beams of the second apparatus, the first plurality of configuration settings at least comprising a first plurality of scrambling identifiers; means for in accordance with a determination that a first transmission beam of the plurality of transmission beams is configured for the first apparatus as a serving beam, selecting, from the first plurality of scrambling identifiers, a first scrambling identifier associated with the first transmission beam; and means for monitoring first control information transmitted by the second apparatus via the first transmission beam using the first scrambling identifier, the first control information indicating presence of data to be transmitted by the second apparatus.

In a sixth aspect, there is provided a second apparatus. The second apparatus comprises means for transmitting, to a first apparatus, configuration information indicating a first plurality of configuration settings associated with a plurality of transmission beams of the second apparatus, the first plurality of configuration settings at least comprising a first plurality of scrambling identifiers; means for in accordance with a determination that a first transmission beam of the plurality of transmission beams is configured for the first apparatus as a serving beam, generating first control information by scrambling the first control information with a first scrambling identifier of the first plurality of scrambling identifiers associated with the first transmission beam, the first control information indicating presence of data to be transmitted by the second apparatus; and means for transmitting the first scrambled control information to the first apparatus via the first transmission beam.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
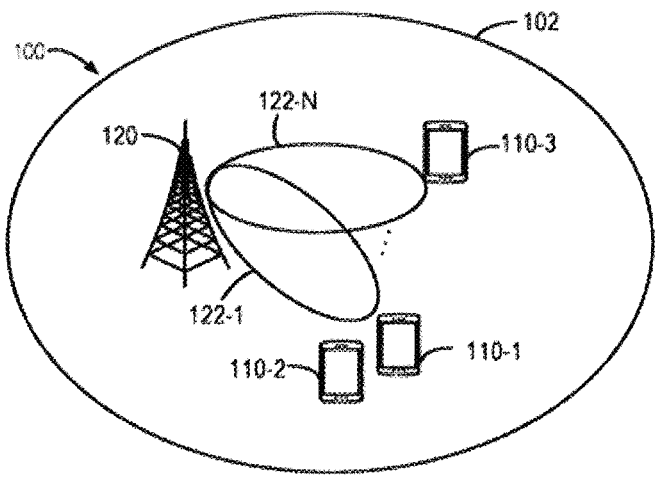
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication environment 100 in which example embodiments of the present disclosure can be implemented. The communication environment 100 includes one or more first devices 110-1, 110-2, 110-3 can communicate with a second device 120. For purpose of discussion, the first devices 110-1, 110-2, 110-3 are collectively or individually referred to as first device 110. In the example of FIG. 1, the first devices 110 are illustrated as terminal devices, and the second device 120 is illustrated as a network device serving the terminal devices. Thus, the serving area of the second device 120 is called as a cell 102.

It is to be understood that the numbers of first devices, second device, and cells are only for the purpose of illustration without suggesting any limitations. The communication environment 100 may include any suitable number of first devices, second device, and cells adapted for implementing embodiments of the present disclosure. It is to be noted that the term "cell" and "serving cell" can be used interchangeably herein. It would be appreciated that the types of the first and second devices are illustrated for the purpose of illustration only. In some cases, the implementations of the first and second device as described herein may also be applied in the case where the first device is a network device or any other device than a terminal device, and the second device is a terminal device or any other device than a network device, if applicable.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In operation, the second device 120 can communicate data and control information to the first device 110 and the first device 110 can also communication data and control information to the second device 120. In the environment 100, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

The communication system 100 may use multiple beams for communications between the first devices 110 and the second device 120. To overcome propagation losses at higher frequency bands and to increase coverage at lower frequency bands, directional beamformed transmission (and reception) using a (large) number of antennas between the first devices 110 and the second device 120. In the example of FIG. 1, the second device 120 supports transmission towards the firs devices 110 via transmission beams 122-1, ..., 122-N, where N is an integer larger than one. For purpose of discussion, the transmission beams 122-1, ..., 122-N collectively or individually referred to as transmission beams 122 or beams 122 for short. As used herein, a transmission beam of a device can be either the beam to be used for transmission of information, a channel, or a signal towards the device or the beam to be used for transmission of information, a channel, or a signal by the device.

When deploying beamforming in the link from the second device 120 to a first link 110, the second device 120, as a transmitter, is able to produce a transmission beam towards the desired first device 110 and nullifies in the directions of the interferers (other first devices 110). The intended receiver (i.e., the first device 110) is aligned with the beam of the second device 120 through a beam management procedure. As illustrated in FIG. 1, the first devices 110-1, 110-2 are aligned with the transmission beam 122-1, and the first device 110-2 is aligned with the transmission beam 122-N. A transmission beam of the second device 120 with which a first device 110 is aligned is referred to as a serving beam for the first device 110. In the example of FIG. 1, the transmission beam 122-1 is a serving beam of the first devices 110-1, 110-2, and the transmission beam 122-N is a serving beam of the first device 110-3.

Discontinuous reception (DRX) can also be applied in the communication system 100 to supports battery saving of the first device 110 by reducing the time for monitoring control information from the second device 120 and entering into an inactive status. Generally, based on configured DRX cycles, a first device 110 wakes up occasionally for on-durations (or ON durations) and monitors for transmission of control information, such as physical downlink control channel (PDCCH). Except for on-durations, the first device 110 may remain in a low power (sleep) state referred to as an off duration (or OFF duration) for the rest of the DRX cycle. During the off-duration, the first device 110 is not expected to transmit and receive any signal.

Figure 2A:
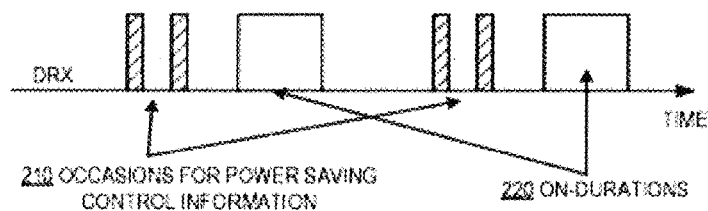
FIG. 2A illustrates an example of DRX with transmission of power saving control information.

In some cases, sleep (OFF) durations may be extended. Particularly, a power saving signal or channel has been defined to instruct a first device to wake up in an upcoming on-duration, for example, when the first device is in radio resource control (RRC)-connected status with the second device. Such a power saving signal is referred to as a wake-up signal (WUS) which may be transmitted as power saving control information. As illustrated in FIG. 2A, there are some occasions 210 for power saving control information before on-durations 220 in DRX. During the occasions 210, the second device 120 may indicate to the first device 110 via dedicated control information to initiate monitoring of further control information (e.g., PDCCH) for scheduled data in a next on-duration. The second device 120 may include a wake-up indication in the control information transmitted during the occasions 210 to indicate the first device 110 to wake up.

Within a DRX cycle, a first device 110 may attempt to receive the control information in the occasions 210. Only when the wake-up indication is detected, the first device 110 wakes up for the next on-duration. Otherwise, if the first device 110 does not receive the control information during the occasions 210 or if the received control information contains no wake-up indication, it may assume that there is no data to be transmitted from the second device 120 and can skip the next on-duration and goes back to sleep until the next DRX cycle. Thus, additional saving power can be achieved when no data is scheduled to the first device 110.

In some example embodiments, to minimize false alarms that lead to waking up a first device 110 unnecessarily, the control information sent in the occasions 210 is targeted to an identifier specific to the first device 110. The identifier may be used to scramble the control information, and thus may be referred to as a scrambling identifier. The first device 110 may be configured with the scrambling identifier and use it to detect the control information.

Figure 2B:
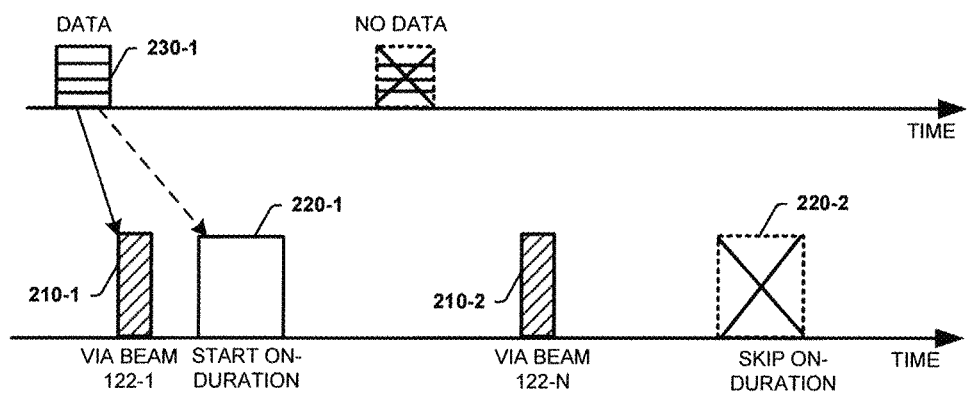
FIG. 2B illustrates an example of DRX with transmission of power saving control information in a multi-beam scenario.

In an example shown FIG. 2B, it is assumed that the second device 120 has data 230-1 to be scheduled for a first device 110-1. The second device 120 may transmit control information with a wake-up indication during an occasion 210-1 in a DRX cycle via the transmission beam 122-1 (also referred to as a first transmission beam). The control information is scrambled with a scrambling identifier that is configured for the first device 110-1 for the transmission beam 122-1. Upon detection and reception of the control information, the first device 110-1 starts an on-duration 220-1 to monitor and receive the data 230-1. The second device 120 may transmit the data 230-1 to the first device 110-1 during the on-duration 220-1. In a next DRX cycle, if no data is to be scheduled for the first device 110-1, control information transmitted during an occasion 210-2 via the transmission beam 122-N may include no wake-up indication, or no control information is transmitted in the occasion 210-2. In this case, the first device 110 skips a next on-duration 220-2.

In some example embodiments, a same scrambling identifier may be configured for one or more first devices 110 having a same serving beam of the second device 120. As such, the second device 120 can indicate a wake-up indication to a plurality of first devices 110 configured with the same scrambling identifier by sending the same control information scrambled with that scrambling identifier. In some embodiments, one first device 110 may only monitor for the information targeted to itself and may not be aware of configurations for other first devices. As such, the second device 120 may configure a plurality of first devices 110 with a same configured arrangement of the control information scrambled by the same scrambling identifier. Therefore, those first devices 110 may wake up at the same time.

Although such configuration would normally be inefficient in terms of power saving for the first devices, it may be beneficial from the perspective of control overhead reduction for the second device.

Figure 3:
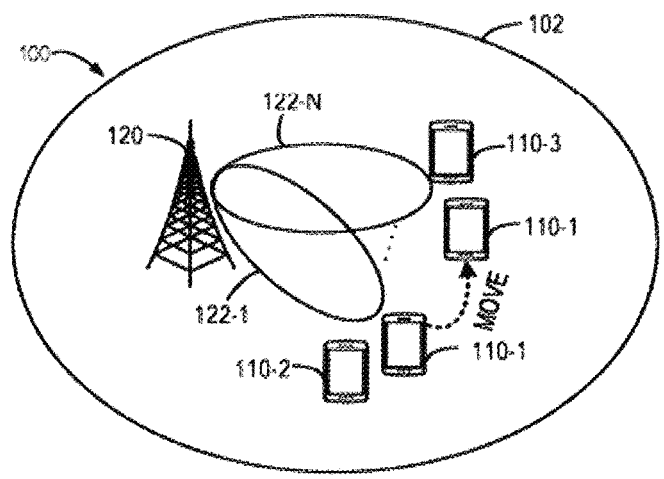
FIG. 3 illustrates an example in which a device moves to trigger the beam switching in the communication environment of FIG. 1.

In some example embodiments, a serving beam of a first device 110 may be switched, which may be controlled by the second device 120. For example, the first device 110-1 moves from one location to another location, as illustrated in FIG. 3. The second device 120 may determine, based on beam-level measurements reporting from the first device 110-1, that the first device 110-1 can be better served by the transmission beam 122-N instead of the current transmission beam 122-1. The second device 120 may transmit a command to indicate the first device 110-1 to switch its serving beam to the transmission beam 122-N. Through the beam switching, the time-frequency radio resource grids may be re-used across the different directions (transmission beams) of the second device 120 to serve the first devices 110 located in these transmission beams 122 using a same time-frequency resource (also denoted as spatial multiplexing between the first devices 110).

However, a second device may generally transmit an initial configuration for transmission of the power saving control information towards one or more first devices that are configured with a same serving beam. The initial configuration may at least include a scrambling identifier for scrambling/descrambling the control information. If one target first device of the first devices has its serving beam changed to a new transmission beam, conventionally, the second device will likely maintain the initial configuration in order to avoid reconfiguration for transmission of the power saving control information (which may involves a RRC-based procedure). As a result, the second device may still use the same scrambling identifier to process the control information transmitted to that target first device via the new transmission beam. This means that additional control information has to be sent via the new transmission beam if one or more other first devices are located towards this transmission beam before the beam switch of the target first device.

Figure 4:
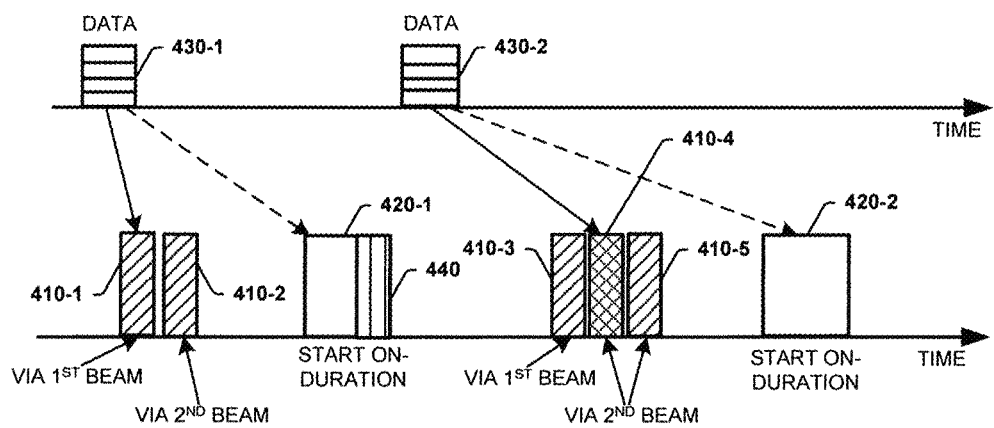
FIG. 4 illustrates another example of DRX with transmission of power saving control information in a multi-beam scenario.

FIG. 4 illustrates an example of of DRX with transmission of power saving control information in the multi-beam scenario. Before movement of a certain first device, if data 430-1 is to be scheduled for this first device, the second device may generate control information scrambled by a same scrambling identifier configured for a plurality of first devices in a first transmission beam. The control information includes a wake-up indication and is transmitted via the first transmission beam in an occasion 410-1, to indicate the certain first device to wake up for the on-duration 410-1. Due to the use of the same scrambling identifier, one or more other first devices may also wake up in the on-duration 420-1. If there is also data to be scheduled for a further first device in a second transmission beam, the second device may scramble control information with a different scrambling identifier configured for the further first device and transmit the control information via the second transmission beam in the occasion 410-2.

In some cases, in addition to transmit the data 430-1, the second device decides to switch the serving beam of the first device from the first transmission beam to a second transmission beam by sending a beam switch command 440 during the on-duration 420-1. In a next DRX cycle, if data 430-2 is to be scheduled to the first device, the second device may transmit the control information scrambled with the scrambling identifier as previously used for the first transmission beam. The control information is transmitted in an occasion 410-4 via the second transmission beam, in order to indicate to the first device to start a next on-duration 420-2. If there is data to be scheduled for transmission to another first device with the second transmission beam as its serving beam, the second device may transmit different control information scrambled with the different scrambling identifier in an occasion 410-5 via the second transmission beam.

In such case, if there is data to be scheduled for transmission to a first device in the first transmission beam, the second device may generate the same control information as the one transmitted in the occasion 410-4 and transmit the control information in the occasion 410-3 via the first transmission beam. That is, the second device has to sand the same control information (which is scrambled with the same scrambling identifier) multiple times (via multiple beams), which may lead to inefficient resource usage. Since each beam switch event in a cell may lead to additional transmission of power saving control information, such transmission of the control information is not optimal from the perspective of capacity. Considering the number of possible transmission beams and the high frequency of the beam switch events due to the mobility of the first device, the second device may not have sufficient resources to support the transmission of the control information.

According to some example embodiments of the present disclosure, there is provided a solution for DRX configuration for multi-beam operations. In this solution, a first device is configured with a plurality of configuration settings associated with a plurality of transmission beams of a second device. The plurality of configuration settings at least comprises a first plurality of scrambling identifiers each associated with one of the plurality of transmission beams. Depending on which one of the plurality of transmission beams is a serving beam configured for the first device, the second device use the associated scrambling identifier to scramble control information that is used to indicate presence or absence of data to be transmitted by the second device. The second device transmits the scrambled control information via the serving beam configured for the first device. The first device monitors for the control information using the associated scrambling identifier.

Through this solution, the second device can configure the control information efficiently in the case where a plurality of transmission beams are configured for a link from the second device to first devices. As the configuration settings, especially the scrambling identifiers, are configured per transmission beam, the first and second devices can quickly switch the associated configuration settings for transmission and reception of the control information, avoiding a slow reconfiguration procedure.

Example embodiments of the present disclosure will be described in detail below with reference to the accompanying drawings.

Figure 5:
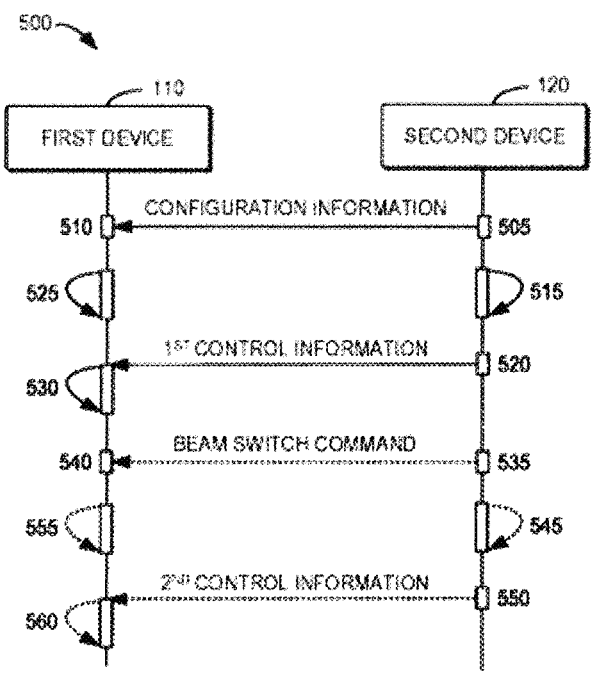
FIG. 5 illustrates a signaling flow for DRX configuration according to some example embodiments of the present disclosure.

Reference is now made to FIG. 5, which shows a signaling flow 500 for DRX configuration according to some example embodiments of the present disclosure. For the purpose of discussion, the signaling flow 500 will be described with reference to FIGS. 1 and 3. The signaling flow 500 involves the first device 110 and the second device 120 in FIG. 1.

As illustrated, the second device 120 transmits 505 configuration information and the first device 110 receives 510 the configuration information. The configuration information is used to set or define a format of control information to be provided to the first device 110 in DRX operations of the first device 110. As compared with the legacy configuration for the first device 110, according to example embodiments of the present disclosure, the configuration information is extended to provide configuration settings per transmission beam.

More specifically, the configuration information indicates a plurality of configuration settings (referred to as a first plurality of configuration settings) associated with a plurality of transmission beams 122 of the second device 120. Instead of configuring a single scrambling identifier for the first device 110, according to example embodiments of the present disclosure, the first plurality of configuration settings at least comprises a plurality of scrambling identifiers (referred to as a first plurality of scrambling identifiers) each associated with or assigned to one of the plurality of transmission beams 122 of the second device 120.

A scrambling identifier may be used to scramble or descramble the control information, such that the first device 110 configured with this scrambling identifier can detect the control information that is targeted to it. The scrambling identifiers may be set as any codes, identifiers, sequences that are unique across the transmission beams 122. In some example embodiments, the scrambling identifiers may comprise Radio Network Temporary Identifiers (RNTIs) which are assigned by the second device 120 for the transmission of the control information. The RNTIs may also be referred to as PS-RNTI where "PS" stands for power saving.

The control information may explicitly indicate association between the first plurality of scrambling identifiers and the plurality of transmission beams 122. For example, each of the first plurality of scrambling identifiers may be mapped to a beam index/identifier of a transmission beam 122.

As an alternative, the first plurality of scrambling identifiers may be implicitly associated with the plurality of transmission beams. For example, a scrambling identifier may be associated with a search space set which is dedicated for transmission of the control information via a given transmission beam 122. Typically, a first device 110 may be configured with common or specific control resource sets (CORESETs).

In some examples, for each of up to four bandwidth parts (BWPs) on a serving cell, up to three CORESETs per configured BWP may be configured for monitoring control information in a PDCCH. To support multi-beam operations for control information, a configuration for beamforming may be provided based on transmission configuration indication (TCI) state configuration per CORESET. If a first device 110 monitors a search space set associated with a CORESET, the first device 110 may receive the control information in the CORESET based on the TCI state configuration configured for that CORESET, such that CORESETs corresponding to different transmission beams 122 are associated to different TCI states. To receive the control information at a time, generally one transmission beam 122 is used. If more than one TCI state is configured for a CORESET, the second device 120 may activate one of the TCI states, for example, using a medium access control (MAC) control element (CE) activation command. Therefore, by associating the scrambling identifiers with the respective search space sets, the first device 110 may be able to implicitly determine which scrambling identifier is associated with a given transmission beam 122. In some embodiments, the first device 110 may determine a scrambling identifier associated with a given transmission beam 122 by receiving, from the second device 120, a MAC CE activation command of a TCI state corresponding to that transmission beam 122.

In some example embodiments, for a first device 110, the second device 120 may include configuration settings (and thus scrambling identifiers) for all the transmission beams 122 configured in the cell 102. In some example embodiments, the configuration settings (and thus scrambling identifiers) may be provided for a subset of the transmission beams 122 configured in the cell 102. The subset may include the transmission beams 122 that are likely to be configured as a serving beam for the first device 110.

As the configuration information is used to configure the control information, in some example embodiments, the second device 120 may transmit corresponding configuration information for one or more first devices 110 in the DRX mode. In some example embodiments, the first device(s) 110 receiving the corresponding control information may be in a RRC connected mode with the second device 120. In some example embodiments, the corresponding configuration information may be provided by the second device 120 via higher layer signaling, for example, through a RRC-based procedure.

In some example embodiments, in addition to the scrambling identifiers, one or more other parameters that are configured for transmission and monitoring of the control information may also be set configured per transmission beam. As some examples, the first configuration settings indicated by the configuration information may include a plurality of parameter sets, each set including one or more of information elements per transmission beam.

In some example embodiments, a parameter set may comprise a location parameter which indicates a bit location of a wake-up indication within control information transmitted via a given transmission beam 122. In an example, the location parameter may include a parameter of ps-PositionDCI-2-6 to indicate the bit location. In some example embodiments, the parameter set may alternatively or additionally comprise a time parameter indicating a start time point for monitoring control information transmitted via a given transmission beam 122. The start time point may be set as relative to the start of a next on-duration of the first device 110. In some example embodiments, the time parameter may be configured directly as a block number) or indirectly as an offset relative to the block number to be used in the current transmission beam at the time the configuration information is received. In an example, the time parameter may include a parameter of "ps-Offset" to indicate the start time point.

In some example embodiments, the parameter set may alternatively or additionally comprise a wake-up indication parameter to indicate to the first device 110 to wake up if the control information is not detected outside an on-duration in a given transmission beam. If this indication is not configured, the first device 110 does not wake up if the control information is not detected outside an on-duration. In an example, the wake-up indication parameter may include a parameter of "ps-Wakeup" to indicate the wake-up indication parameter.

In some example embodiments, the parameter set may alternatively or additionally comprise one or more channel information parameters to indicate the first device 110 to transmit corresponding channel information depending on whether the control information is detected via a given transmission beam 122. In an example embodiment, the channel information parameters may include a channel information parameter to indicate the first device 110 to transmit periodic reference signal received power (RSRP) report(s) if an on-duration (for example, the drx-onDurationTimer) does not start. Such channel information parameter may include a parameter of "ps-TransmitPeriodicL1-RSRP." If this channel information parameter not configured, the first device 110 does not transmit periodic RSRP report(s) if the on-duration (for example, the drx-onDurationTimer) does not start. In another example embodiment, the channel information parameters may include a channel information parameter to indicate the first device 110 to transmit periodic channel status information (CSI) report(s) if an on-duration (for example, the drx-onDurationTimer) does not start. Such channel information parameter may include a parameter of "ps-TransmitPeriodicLCSI" If this channel information parameter not configured, the first device 110 does not transmit periodic CSI report(s) if the on-duration (for example, the drx-onDurationTimer) does not start.

In some example embodiments, the control information may be transmitted in DCI format 2-6. Thus, a certain configuration setting associated with a given transmission beam 122 in the configuration information may be defined in Table 1 as follows:

information according to the format of the control information. In some example embodiments, the parameter set may alternatively or additionally comprise a parameter indicating payload size of control information via a given transmission beam 122. The parameter indicating the payload size may include a parameter of "sizeDCI-2-6." In some example embodiments, a parameter set may alternatively or additionally include a dormancy indications applicable to control information via a given transmission beam 122. The plurality of dormancy indications indicates dormancy of at least one secondary cell (SCell) of the first device 110 outside an on-duration of the DRX. Such a dormancy indication may also be referred to as a SCell dormancy indication. The dormancy indication may comprise a regular SCell dormancy indication applicable to control information scrambled with the scrambling identifier assigned to the given transmission beam and may additionally indicate whether the same SCell dormancy indication is applicable to control information scrambled with another scrambling identifier or not. Alternatively, a bitmap for the dormancy

TABLE 1

| | |
|---|---|
| DCP-Config-r16 ::= | SEQUENCE { |
| ps-RNTI-r16 | RNTI-Value, |
| ps-Offset-r16 | ENUMERATED {ms0dot125, ms0dot25, ms0dot5, ms1, ms2, ms3, ms4, ms5, ms6, ms7, ms8, ms9, ms10, ms11, ms12, ms13, ms14, spare15, spare14, spare13, spare12, spare11, spare10, spare9, spare8, spare7, spare6, spare5, spare4, spare3, spare2, spare1}, |
| sizeDCI-2-6-r16 | INTEGER (1..maxDCI-2-6-Size-r16), |
| ps-PositionDCI-2-6-r16 | INTEGER (0..maxDCI-2-6-Size-1-r16), |
| ps-WakeUp-r16 | ENUMERATED {true} OPTIONAL, -- Need S |
| ps-TransmitPeriodicL1-RSRP-r16 | ENUMERATED {true} OPTIONAL, -- Need S |
| ps-TransmitPeriodicCSI-r16 | ENUMERATED {true} OPTIONAL -- Need S |
| } | |

| ps-RNTI |
|---|
| RNTI value for scrambling CRC of DCI format 2-6 used for power saving (see TS 38.213 [13], clause 10.1). |
| ps-Offset |
| The start of the search-time of DCI format 2-6 with CRC scrambled by PS-RNTI relative to the start of the drx-onDurationTimer of Long DRX (see TS 38.213 [13], clause 11.5). Value in milliseconds. ms0dot125 corresponds to 0.125 ms, ms0dot25 corresponds to 0.25 ms, ms0dot5 corresponds to 0.5 ms, and so on. |
| ps-WakeUp |
| Indicates the UE to wake-up if DCI format 2-6 is not detected outside active time (see TS 38.213 [13], clause 11.5). If the field is absent, the UE does not wake-up if DCI format 2-6 is not detected outside active time. |
| ps-PositionDCI-2-6 |
| Starting position of UE wakeup and SCell dormancy indication in DCI format 2-6 (see TS 38.213 [13], clause 11.5). |
| ps-TransmitPeriodicL1-RSRP |
| Indicates the UE to transmit periodic L1-RSRP report(s) when the drx-onDurationTimer does not start (see TS 38.321 [3], clause 5.7). If the field is absent, the UE does not transmit periodic L1-RSRP report(s) when the drx-onDurationTimer does not start. |
| ps-TransmitPeriodicCSI |
| Indicates the UE to transmit periodic CSI report(s) when the drx-onDurationTimer does not start (see TS 38.321 [3], clause 5.7). If the field is absent, the UE does not transmit periodic CSI report(s) when the drx-onDurationTimer does not start. |

It would be appreciated that in addition to those parameters in Table 1 or as alternatives, one or more parameters per transmission beam may be included in the configuration indication can be provided for the given transmission beam 122. Such a bitmap may also be provided explicitly in the control information to be transmitted in the following.

Some example embodiments of the configurations of the control information have been discussed above. In DRX operations, the second device 120 may decide to transmit control information in some cases. In some example embodiments, the control information may be used to instruct one or more first devices 110 outside a DRX active time (i.e., outside an on-duration) of a DRX cycle to wake up or not for a next on-duration. Such control information is introduced to further improve power efficiency during the DRX operations, and thus may also be referred to as power saving control information, wake-up control information, or wake-up signal (WUS) control information.

According to example embodiments of the present disclosure, as the first device 110 is configured with the first plurality of configuration settings for the plurality of transmission beams 122, the second device 120, which decides to transmit control information to the first device 110, determines a serving beam of the first device 110. A serving beam is a directional transmission beam 122 that is used for transmission towards the first device 110. The first device 110 may be configured to be aligned with the serving beam in order to receive information transmitted in that direction. As an example, for the first device 110-1, its serving beam may be the transmission beam 122-1 in the environment shown in FIG. 1.

If the second device 120 determines that a first transmission beam of the plurality of transmission beams 122 is configured for the first device as its serving beam, the second device 120 determines a first scrambling identifier of the first plurality of scrambling identifiers associated with the first transmission beam based on the control information transmitted to the first device 110. The second device 120 generates 515 control information (referred to as first control information) by scrambling the first control information with the first scrambling identifier. The first control information indicates presence or absence of data to be transmitted by the second device 110 to the first device 110. The second device 120 transmits 520 the first scrambled control information to the first device 110 via the first transmission beam 122.

As mentioned above, in some example embodiments, the control information may be used to instruct the first device 110 outside a DRX active time (i.e., outside an on-duration) of a DRX cycle to wake up or not for a next on-duration. Depending on whether the second device 120 has data to be transmitted to the first device 110, the second device 120 may generate first control information to indicate whether the first device 110 to wake up or not for an on-duration. In some example embodiments, the first control information may include a wake-up indication. The wake-up indication may be a one-bit indication with a value (e.g., 1) to indicate the first device 110 to wake up and the other value (e.g., 0) to indicate the first device 110 to skip the next on-duration. In other examples, the wake-up indication may be represented in other ways to indicate whether the first device 110 to wake up or not for an on-duration.

In some example embodiments, the wake-up indication may be included in the first control information only if the second device 120 has data to be transmitted to the first device 110; otherwise, the second device 120 may not transmit such control information to the first device 110. In some example embodiments, if two or more first devices 110 are configured with the first transmission beam, the second device 120 may multiplex the wake-up indication into the first control information scrambled with the first scrambling identifier if data is to be transmitted to any of the two or more first devices 110.

In some example embodiments, in addition to the wake-up indication or as an alternative, the first control information may further comprise a dormancy indication to indicate dormancy of at least one secondary cell (SCell) of the first device 112 outside the on-duration of the DRX. The dormancy indication may be included in the first control information if a higher layer parameter Scell-groups-for-dormancy-outside-active-time is configured for the first device 110. Otherwise, the dormancy indication in the first control information is zero bit.

In some example embodiments, if the dormancy indication is included, the the dormancy indication may be immediately after the wake-up indication in the first control information. In some example embodiments, the the dormancy indication may include a bitmap with each bit corresponding to one of the SCell groups configured for the first device 110, where the most significant bit (MSB) or the lowest significant bit (LSB) of the bitmap corresponds to the first or last configured SCell group. The size of the bitmap may be equal to the number of configured SCell groups. For example, the bitmap may include a 1, 2, 3, 4, or 5 bits, which may be determined, for example, according to the higher layer parameter Scell-groups-for-dormancy-outside-active-time.

In some example embodiments, a "0" value for a bit of the bitmap indicates an active BWP, provided by dormant-BWP, for the first device 110 for each activated SCell in the corresponding configured SCell group. In some example embodiments, a "1" value for a bit of the bitmap may indicate an active BWP, provided by first-non-dormant-BWP-ID-for-DCI-outside-active-time, for the first device 110 for each activated SCell in the corresponding configured SCell group if a current active BWP is the dormant BWP, or indicate a current active DL BWP, for the first device 110 for each activated SCell in the corresponding configured SCell group if the current active BWP is not the dormant BWP.

It would be appreciated that the first control information may include other information to be transmitted to the first device 110, in addition to the wake-up indication and the dormancy indication.

In some example embodiments, in scrambling the first control information, the second device 120 may use the first scrambling identifier to scramble the cyclic redundancy check of the first control information. In the example embodiments where the first device 110 is a terminal device and the second device 120 is a network device, the control information is to be transmitted in a PDCCH and thus may be referred to as downlink control information (DCI). As mentioned above, the control information is also referred to as power saving control information or WUS control information, the control information scrambled with the scrambling identifier (e.g., the PS-RNTI) may be referred to as DCI with CRC scrambled by PS-RNTI (or DCP for short) or may be referred to as WUS-DCI.

In some example embodiments, in addition to the scrambling identifiers, other parameters for the control information may also be configured per transmission beam. In this case, the second device 120 may generate and transmit the first control information according to one of the configuration settings (for example, the additional parameter set) associated with the first transmission beam, including the location of the wake-up indication in the first control information, the time point for transmitting the first control information, the dormancy indication, and/or the like.

At the side of the first device 110, it determines that a first transmission beam of the plurality of transmission beams 122 is configured as its serving beam and thus selects 525, from the first plurality of scrambling identifiers, the first scrambling identifier associated with the first transmission beam. The first device 110 may determine the first scrambling identifier that is explicitly mapped to the first transmission beam 122 according to the beam index or identifier. Alternatively, if the association between the first plurality of scrambling identifiers and the transmission beams 122 is implicitly indicated via the search space set, the first device 110 may determine the active search space set, for example, according to a MAC CE activation command of a TCI state. If the TCI state is corresponding to the first transmission beam, the first device 110 may determine that the first scrambling identifier associated with the corresponding search space set.

The first device 110 monitors 530 for the first control information transmitted by the second device 120 via the first transmission beam 122 using the first scrambling identifier. In some example embodiments, the first device 110 may be in a DRX mode when monitoring for the first control information. As used herein, the term "monitor" indicates that the first device 110 attempts to receive information at a given time by searching resources in a given search space set. For example, the first device 110 may monitor for the first control information in one or more occasions of a DRX cycle that is defined for transmission of control information used to indicate presence or absence of data from the second device 120. In addition, the first device 110 may have its antennas aligned to the first transmission beam 122 and search for the first control information in the configured common or specific CORESET(s).

The first device 110 may try to descramble information received in the direction of the first transmission beam 122. Depending on whether the second device 120 transmits the first control information or not, the first deice 110 may or may not detect the first control information. In addition to the usage of the first scrambling identifier, the first device 110 may monitor for the first control information based on one or more other parameters included in a configuration set associated with the first transmission beam 122.

If the first control information includes a wake-up indication indicating the first device 110 to wake up in a next on-duration, the first device 110 may wake up by starting a drx-onDurationTimer accordingly. Otherwise, if the wake-up indication is not included or the wake-up indication indicates the first device 110 not to wake up, the first device 110 may skip the next on-duration.

Figure 6:
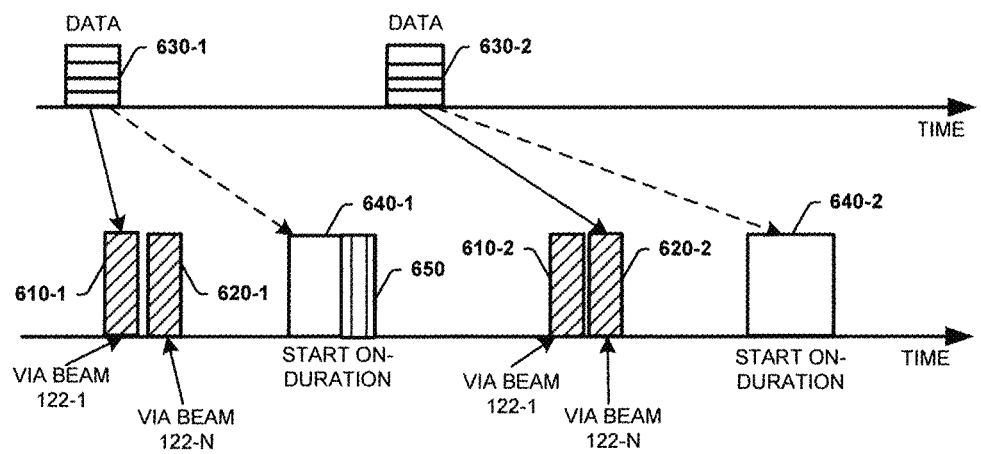
FIG. 6 illustrates an example of DRX with transmission of WUS in a multi-beam scenario according to some example embodiments of the present disclosure.

FIG. 6 illustrates an example where the second device 120 has data 630-1 to be transmitted to the first device 110-1. The second device 120 may transmit control information with a wake-up indication during an occasion 610-1 in a DRX cycle via the transmission beam 122-1 (also referred to as a first transmission beam). The control information is scrambled with a scrambling identifier that is configured for the first device 110-1 for the transmission beam 122-1. Upon detection and reception of the control information, the first device 110-1 starts an on-duration 640-1 to monitor and receive the data 630-1. Similarly, if the second device 120 has data (not shown) to be transmitted to the first device 110-3, it may generate and transmit control information with a wake-up indication during an occasion 620-1 via the transmission beam 122-1 which is the serving beam of the first device 110-3.

In some cases, the serving beam of the first device 110 may change., which may be controlled by the second device 120. For example, the first device 110-1 moves from one location to another location, as illustrated in FIG. 3. The second device 120 may determine, based on beam-level measurements reporting from the first device 110-1, that the first device 110-1 can be better served by the transmission beam 122-N instead of the current transmission beam 122-1. Referring back to FIG. 5, the signaling flow 500 further include operations of the first and second device 120, 120 after the beam switch for a certain first device 110.

Specifically, the second device 120 transmits 535 a command to indicate the first device 110-1 to switch its serving beam from the current first transmission beam to a transmission beam 122-N. The command is referred to as a beam switch command. The beam switch command may be transmitted via a MAC CE, for example, during an on-duration of the first device 110. In the example of FIG. 6, a beam switch command 650 may be transmitted in the started on-duration 640-1 to the first device 110-1 to indicate the first device 110 to switch the serving beam to the transmission beam 122-N. The first device 110 receives 540 the beam switch command and may align to the second transmission beam. After the beam switch, if the second device 120 transmits further control information to this first device 110, the second device 120 mat utilize one of the first plurality of configuration settings associated with the second transmission beam 122.

The second device 120 generates 545 second control information by scrambling the second control information with a second scrambling identifier associated with the second transmission beam 122. The second control information indicates presence or absence of further data to be transmitted by the second device 120. The second device 120 transmits 550 the second control information to the first device 110 via the second transmission beam.

In some example embodiments, the second control information may be generated to include the wake-up indication or not depending on whether the second device 120 has data to be scheduled to the first device 110 or not. In some example embodiments, the second control information may be generated according to one or more other parameters in the configuration information that are associated with the second transmission beam. The generation and transmission of the second control information is similar as the first control information, and the difference is that the different configuration setting associated with the second transmission beam 122 is used.

At the side of the first device 110, upon reception of the beam switch command, it determines that the serving beam is changed to the second transmission beam 122 and thus selects 555, from the first plurality of scrambling identifiers, the second scrambling identifier associated with the second transmission beam 122. The selection of the second scrambling identifier is similar as the selection of the first scrambling identifier. The first device 110 monitors 560 for the second control information transmitted by the second device 120 via the second transmission beam 122 using the second scrambling identifier. The first device 110 may monitor for the second control information in an occasion defined for the power saving control information. The first device 110 may try to descramble information received in the direction of the second transmission beam 122 to obtain the second control information. In addition to the usage of the second scrambling identifier, the first device 110 may monitor for the second control information based on one or more other parameters included in a configuration set associated with the second transmission beam 122.

Still referring to the example of FIG. 6, if the second device 120 has data 630-2 to be transmitted to the first device 110-1 after its serving beam is switched to the transmission beam 122-N, the second device 120 may transmit control information with a wake-up indication during an occasion 620-2 in a DRX cycle via the transmission beam 122-N (also referred to as a second transmission beam). The control information is scrambled with a scrambling identifier that is configured for the first device 110-1 for the transmission beam 122-N. Upon detection and reception of the control information, the first device 110-1 starts an on-duration 620-2 to monitor and receive the data 630-2.

Similarly, if the second device 120 has data (not shown) to be transmitted to the first device 110-3, it may generate the same control information scrambled with the second scrambling identifier and transmit the control information in an occasion 620-2 via the transmission beam 122-N which is also the serving beam of the first device 110-3. Only in the case that the second device 120 has data (not shown) to be transmitted to the first device 110-2, it may generate and transmit different control information scrambled with the first scrambling identifier and transmit the control information in an occasion 610-2 via the transmission beam 122-1.

In some example embodiments, after transmitting the initial configuration information, the second device 120 may have some ways to change or update the configuration for the transmission and monitoring of the control information.

In some example embodiments, in addition to the first plurality of configuration settings, the configuration information transmitted at 505 may further include a second plurality of configuration settings associated with the plurality of transmission beams 122. The second plurality of configuration settings may include a second plurality of scrambling identifiers, and may additionally include a plurality of parameter sets associated with the plurality of transmission beams 122. The formats of the second plurality of configuration settings may be similar to those of the first plurality of configuration settings, but the association between the second plurality of configuration settings and the plurality of transmission beams 122 may be different. For example, a first scrambling identifier may be associated with a first transmission beam 122 according to the first plurality of configuration settings, and may be changed to be associated with a second transmission beam 122 according to the second plurality of configuration settings. The association with one or more other parameters in the first plurality of configuration settings may be changed in the second plurality of configuration settings.

In operation, the second device 120 may dynamically indicate to the first device 110 whether the first plurality of configuration settings or the second plurality of configuration settings is applicable for the first device 110. In some example embodiments, the information of such indication may be transmitted to the first device 110 via the MAC CE. The first device 110 may utilize either the first plurality of configuration settings or the second plurality of configuration settings to determine which configuration setting (for example, which scrambling identifier) is used to detect the control information. For example, in detecting the first control information, the first device 110 may determine, based on the information from the second device 120, that the first plurality of configuration settings is applicable and then select the first scrambling identifier from the first plurality of scrambling identifiers indicated by the first plurality of configuration settings.

It would be appreciated that although two sets of configuration settings are described to be included in the configuration information, the second device 120 may initially configure more different sets of configuration settings for a first device 110.

In some example embodiments, the second device 120 may dynamically change one or more of the parameters indicated in the first or second plurality of configuration settings. Specifically, the second device 120 may transmit, to the first device 110, update information of updating one scrambling identifier associated with the current serving beam 122 (for example, the second scrambling identifier associated with the second transmission beam 122) to a different scrambling identifier (for example, a third scrambling identifier). Upon reception of such update information, the first device 110 may use the new scrambling identifier (i.e., the third scrambling identifier) to detect the following control information transmitted via the current serving beam 122 from the second device 120. In another example, the update information from the second device 120 may indicate to the first device 110 that a transmission beam associated with a scrambling identifier has been updated to another transmission beam. For example, the second transmission beam associated with the second scrambling identifier is changed to a third transmission beam which may or may not be included in the previous plurality of transmission beams. In some example embodiments, the update information may be transmitted to the first device 110 via the MAC CE.

In addition to the scrambling identifier(s) and/or the transmission beam(s), one or more other parameters set in the configuration information for a given transmission beam 122 may also be dynamically changed by the second device 120 via the update information, including the location parameter which indicates a bit location of a wake-up indication within control information, the start time point for monitoring the control information, and/or the like.

By dynamically changing the configuration setting associated with a certain transmission beam, the second device 120 may be able to quickly re-shuffle the first devices 110 configured with the same serving beams, so as to ensure efficient usage of the control information. In turn, resource efficiency for transmission of the control information can be maintained when one or more first devices 110 switch their serving beams.

Figure 7:
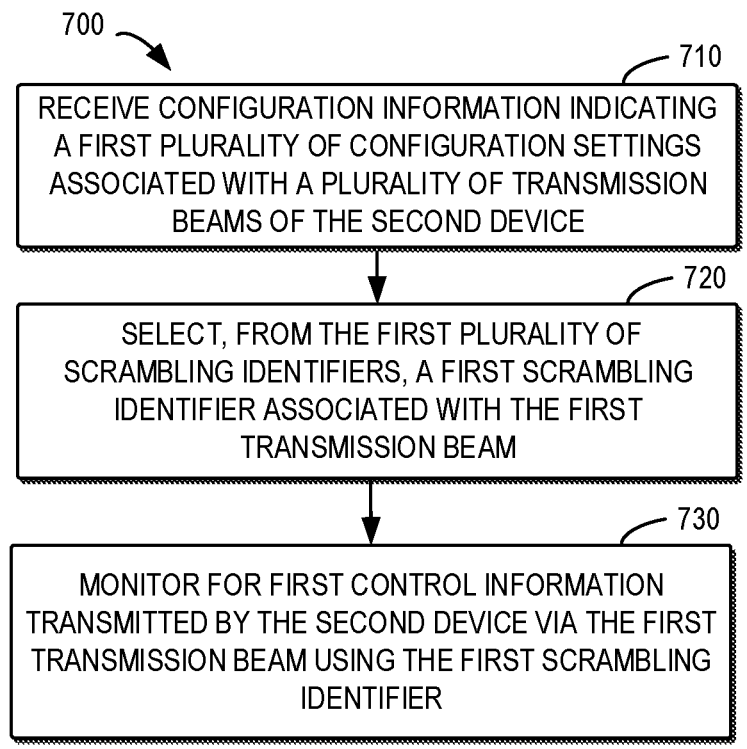
FIG. 7 illustrates a flowchart of a method implemented at a first device according to some other example embodiments of the present disclosure.

FIG. 7 shows a flowchart of an example method 700 implemented at a first device in accordance with some example embodiments of the present disclosure. For the purpose of discussion, the method 700 will be described from the perspective of the first device 110 with respect to FIGS. 1 and 3.

At block 710, the first device 110 receives, from a second device 120, configuration information indicating a first plurality of configuration settings associated with a plurality of transmission beams of the second device 120, the first plurality of configuration settings at least comprising a first plurality of scrambling identifiers. At block 720, in accordance with a determination that a first transmission beam of the plurality of transmission beams is configured for the first device 110 as a serving beam, the first device 110 selects, from the first plurality of scrambling identifiers, a first scrambling identifier associated with the first transmission beam. At block 730, the first device 110 monitors for first control information transmitted by the second device 120 via the first transmission beam using the first scrambling identifier, the first control information indicating presence of data to be transmitted by the second device. In some example embodiments, the first device 110 may monitor the first control information in a discontinuous reception mode.

In some example embodiments, the method 700 further comprises in accordance with a determination that the serving beam is switched from the first transmission beam to a second transmission beam of the plurality of transmission beams, selecting, from the first plurality of scrambling identifiers, a second scrambling identifier associated with the second transmission beam; and monitoring, based on the second scrambling identifier, for second control information transmitted by the second device 120 via the second transmission beam, the second control information indicating presence of further data to be transmitted by the second device.

In some example embodiments, monitoring for the second control information comprises: receiving, from the second device 120, update information of updating the second scrambling identifier associated with the second transmission beam to a third scrambling identifier; and in response to reception of the update information, monitoring for the second control information using the third scrambling identifier.

In some example embodiments, the first plurality of configuration settings further comprise a plurality of parameter sets associated with the plurality of transmission beams comprising at least one of the following: a first plurality of location parameters indicating respective bit locations of a wake-up indication within control information transmitted from the second device 120 via the plurality of transmission beams, a plurality of dormancy indications applicable to control information transmitted by the second device 120 via the plurality of transmission beams, the plurality of dormancy indications indicating dormancy of at least one secondary cell of the first device 110 outside an on-duration of discontinuous reception, a plurality of time parameters indicating respective start time points for monitoring control information transmitted from the second device 120 via the plurality of transmission beams, and a plurality of payload sizes of control information transmitted from the second device 120 via the plurality of transmission beams.

In some example embodiments, monitoring for the first control information comprises: selecting, from the plurality of parameter sets, a first parameter set associated with the first transmission beam; and monitoring for the first control information based on the first parameter set.

In some example embodiments, the first control information comprises at least one of: a wake-up indication to indicate whether the first device 110 wakes up or not in an on-duration of discontinuous reception, and a dormancy indication to indicate dormancy of at least one secondary cell of the first device 110 outside the on-duration of the discontinuous reception.

In some example embodiments, the first plurality of scrambling identifiers comprises a plurality of power saving-radio network temporary identifiers.

In some example embodiments, the configuration information further indicates a second plurality of configuration settings associated with the plurality of transmission beams, the second plurality of configuration settings at least comprising a second plurality of scrambling identifiers. In some example embodiments, selecting the first scrambling identifier set comprises: receiving, from the second device 120, information indicating whether the first plurality of configuration settings or the second plurality of configuration settings is applicable for the first device 110; and in accordance with a determination that the first plurality of configuration settings is applicable for the first device 110, selecting the first scrambling identifier from the first plurality of scrambling identifiers.

Figure 8:
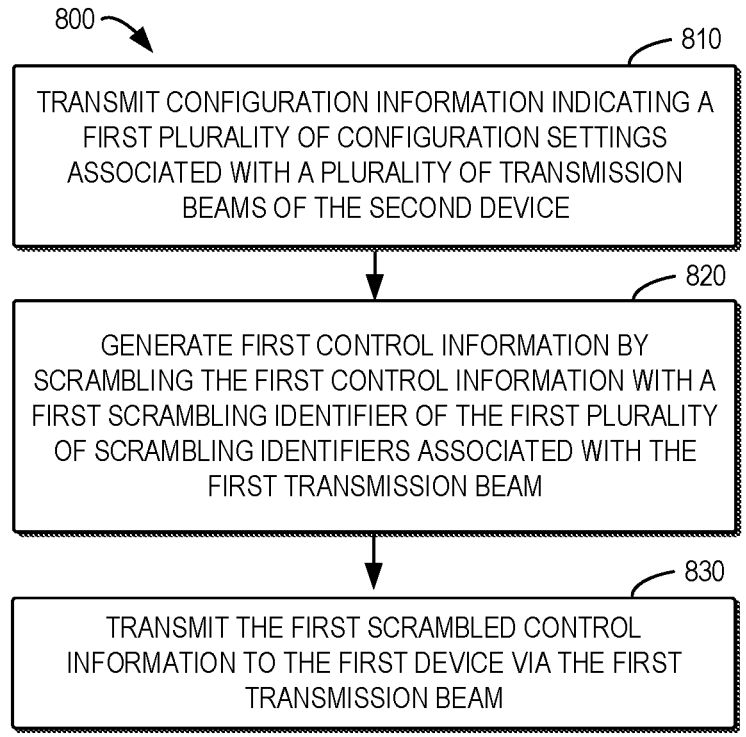
FIG. 8 illustrates a flowchart of a method implemented at a second device according to some other example embodiments of the present disclosure.

FIG. 8 shows a flowchart of an example method 800 implemented at a second device 120 in accordance with some example embodiments of the present disclosure. For the purpose of discussion, the method 800 will be described from the perspective of the second device 120 with respect to FIGS. 1 and 3.

At block 810, the second device 120 transmits, to a first device 110, configuration information indicating a first plurality of configuration settings associated with a plurality of transmission beams of the second device 120, the first plurality of configuration settings at least comprising a first plurality of scrambling identifiers. At block 820, in accordance with a determination that a first transmission beam of the plurality of transmission beams is configured for the first device 110 as a serving beam, the second device 120 generates first control information by scrambling the first control information with a first scrambling identifier of the first plurality of scrambling identifiers associated with the first transmission beam, the first control information indicating presence of data to be transmitted by the second device. At block 830, the second device 120 transmits the first scrambled control information to the first device 110 via the first transmission beam.

In some example embodiments, generating the first control information comprises: in accordance with a determination that the first transmission beam is configured for the first device 110 as the serving beam and a further determination that data is to be transmitted to the first device 110, scrambling the first control information with the first scrambling identifier.

In some example embodiments, the method 800 further comprises in accordance with a determination that the serving beam is switched from the first transmission beam to a second transmission beam of the plurality of transmission beams, generating second control information based on a second scrambling identifier of the first plurality of scrambling identifiers associated with the second transmission beam, the second control information indicating presence of further data to be transmitted by the second device; and transmitting the second scrambled control information to the first device 110 via the second transmission beam.

In some example embodiments, generating the second control information comprises: transmitting, to the first device 110, update information of updating the second scrambling identifier associated with the second transmission beam to a third scrambling identifier; and in response to transmission of the update information, scrambling the second control information with the third scrambling identifier.

In some example embodiments, the first plurality of configuration settings further comprise a plurality of parameter sets associated with the plurality of transmission beams comprising at least one of the following: a first plurality of location parameters indicating respective bit locations of a wake-up indication within control information transmitted from the second device 120 via the plurality of transmission beams, a plurality of dormancy indications applicable to control information transmitted by the second device 120 via the plurality of transmission beams, the plurality of dormancy indications indicating dormancy of at least one secondary cell of the first device 110 outside an on-duration of discontinuous reception, a plurality of time parameters indicating respective start time points for monitoring control information transmitted from the second device 120 via the plurality of transmission beams, and a plurality of payload sizes of control information transmitted from the second device 120 via the plurality of transmission beams.

In some example embodiments, generating the first control information comprises: selecting, from the plurality of parameter sets, a first parameter set associated with the first transmission beam; and generating the first control information based on the first parameter set.

In some example embodiments, the configuration information further indicates a second plurality of configuration settings associated with the plurality of transmission beams, the second plurality of configuration settings at least comprising a second plurality of scrambling identifiers. In some example embodiments, the method 800 further comprises: transmitting, to the first device 110, information indicating whether the first plurality of configuration settings or the second plurality of configuration settings is applicable for the first device 110. In some example embodiments, generating first control information comprises in accordance with a determination that the first plurality of configuration settings is applicable for the first device 110, selecting the first scrambling identifier from the first plurality of scrambling identifiers.

In some example embodiments, a first apparatus capable of performing any of the method 700 (for example, the first device 110) may comprise means for performing the respective operations of the method 700. The means may be implemented in any suitable form. For example, the means may be implemented in a circuitry or software module. The first apparatus may be implemented as or included in the first device 110.

In some example embodiments, the first apparatus comprises means for receiving, from a second apparatus, configuration information indicating a first plurality of configuration settings associated with a plurality of transmission beams of the second apparatus, the first plurality of configuration settings at least comprising a first plurality of scrambling identifiers; means for in accordance with a determination that a first transmission beam of the plurality of transmission beams is configured for the first apparatus as a serving beam, selecting, from the first plurality of scrambling identifiers, a first scrambling identifier associated with the first transmission beam; and means for monitoring for first control information transmitted by the second apparatus via the first transmission beam using the first scrambling identifier, the first control information indicating presence of data to be transmitted by the second apparatus.

In some example embodiments, the means for monitoring comprises means for monitoring for the first control information in a discontinuous reception mode.

In some example embodiments, the first apparatus further comprises means for in accordance with a determination that the serving beam is switched from the first transmission beam to a second transmission beam of the plurality of transmission beams, selecting, from the first plurality of scrambling identifiers, a second scrambling identifier associated with the second transmission beam; and means for monitoring, based on the second scrambling identifier, for second control information transmitted by the second apparatus via the second transmission beam, the second control information indicating presence of further data to be transmitted by the second apparatus.

In some example embodiments, the means for monitoring for the second control information comprises: receiving, from the second apparatus, update information of updating the second scrambling identifier associated with the second transmission beam to a third scrambling identifier; and means for in response to reception of the update information, monitoring for the second control information using the third scrambling identifier.

In some example embodiments, the first plurality of configuration settings further comprise a plurality of parameter sets associated with the plurality of transmission beams comprising at least one of the following: a first plurality of location parameters indicating respective bit locations of a wake-up indication within control information transmitted from the second apparatus via the plurality of transmission beams, a plurality of dormancy indications applicable to control information transmitted by the second apparatus via the plurality of transmission beams, the plurality of dormancy indications indicating dormancy of at least one secondary cell of the first apparatus outside an on-duration of discontinuous reception, a plurality of time parameters indicating respective start time points for monitoring control information transmitted from the second apparatus via the plurality of transmission beams, and a plurality of payload sizes of control information transmitted from the second apparatus via the plurality of transmission beams.

In some example embodiments, the means for monitoring for the first control information comprises: means for selecting, from the plurality of parameter sets, a first parameter set associated with the first transmission beam; and means for monitoring for the first control information based on the first parameter set.

In some example embodiments, the first control information comprises at least one of: a wake-up indication to indicate whether the first apparatus wakes up or not in an on-duration of discontinuous reception, and a dormancy indication to indicate dormancy of at least one secondary cell of the first apparatus outside the on-duration of the discontinuous reception.

In some example embodiments, the first plurality of scrambling identifiers comprises a plurality of power saving-radio network temporary identifiers.

In some example embodiments, the configuration information further indicates a second plurality of configuration settings associated with the plurality of transmission beams, the second plurality of configuration settings at least comprising a second plurality of scrambling identifiers. In some example embodiments, the means for selecting the first scrambling identifier set comprises: receiving, from the second apparatus, information indicating whether the first plurality of configuration settings or the second plurality of configuration settings is applicable for the first apparatus; and means for in accordance with a determination that the first plurality of configuration settings is applicable for the first apparatus, selecting the first scrambling identifier from the first plurality of scrambling identifiers.

In some example embodiments, the first apparatus comprises a terminal device and the second apparatus comprises a network device.

In some example embodiments, the first apparatus further comprises means for performing other operations in some example embodiments of the method 700. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the method 800 (for example, the second device 120) may comprise means for performing the respective operations of the method 800. The means may be implemented in any suitable form. For example, the means may be implemented in a circuitry or software module. The second apparatus may be implemented as or included in the second device 120.

In some example embodiments, the second apparatus comprises means for transmitting, to a first apparatus, configuration information indicating a first plurality of configuration settings associated with a plurality of transmission beams of the second apparatus, the first plurality of configuration settings at least comprising a first plurality of scrambling identifiers; means for in accordance with a determination that a first transmission beam of the plurality of transmission beams is configured for the first apparatus as a serving beam, generating first control information by scrambling the first control information with a first scrambling identifier of the first plurality of scrambling identifiers associated with the first transmission beam, the first control information indicating presence of data to be transmitted by the second apparatus; and means for transmitting the first scrambled control information to the first apparatus via the first transmission beam.

In some example embodiments, the means for generating the first control information comprises: means for in accordance with a determination that the first transmission beam is configured for the first apparatus as the serving beam and a further determination that data is to be transmitted to the first apparatus, scrambling the first control information with the first scrambling identifier.

In some example embodiments, the second apparatus further comprises means for in accordance with a determination that the serving beam is switched from the first transmission beam to a second transmission beam of the plurality of transmission beams, generating second control information based on a second scrambling identifier of the first plurality of scrambling identifiers associated with the second transmission beam, the second control information indicating presence of further data to be transmitted by the second apparatus; and means for transmitting the second scrambled control information to the first apparatus via the second transmission beam.

In some example embodiments, the means for generating the second control information comprises: means for transmitting, to the first apparatus, update information of updating the second scrambling identifier associated with the second transmission beam to a third scrambling identifier; and the means for in response to transmission of the update information, scrambling the second control information with the third scrambling identifier.

In some example embodiments, the first plurality of configuration settings further comprise a plurality of parameter sets associated with the plurality of transmission beams comprising at least one of the following: a first plurality of location parameters indicating respective bit locations of a wake-up indication within control information transmitted from the second apparatus via the plurality of transmission beams, a plurality of dormancy indications applicable to control information transmitted by the second apparatus via the plurality of transmission beams, the plurality of dormancy indications indicating dormancy of at least one secondary cell of the first apparatus outside an on-duration of discontinuous reception, a plurality of time parameters indicating respective start time points for monitoring control information transmitted from the second apparatus via the plurality of transmission beams, and a plurality of payload sizes of control information transmitted from the second apparatus via the plurality of transmission beams.

In some example embodiments, the means for generating the first control information comprises: means for selecting, from the plurality of parameter sets, a first parameter set associated with the first transmission beam; and means for generating the first control information based on the first parameter set.

In some example embodiments, the configuration information further indicates a second plurality of configuration settings associated with the plurality of transmission beams, the second plurality of configuration settings at least comprising a second plurality of scrambling identifiers. In some example embodiments, the second apparatus further comprises: means for transmitting, to the first apparatus, information indicating whether the first plurality of configuration settings or the second plurality of configuration settings is applicable for the first apparatus. In some example embodiments, the means for generating first control information comprises means for in accordance with a determination that the first plurality of configuration settings is applicable for the first apparatus, selecting the first scrambling identifier from the first plurality of scrambling identifiers.

In some example embodiments, the first apparatus comprises a terminal device and the second apparatus comprises a network device.

In some example embodiments, the second apparatus further comprises means for performing other operations in some example embodiments of the method 800. In some example embodiments, the means comprises at least one processor; and at least one memory including computer program code, the at least one memory and computer program code configured to, with the at least one processor, cause the performance of the second apparatus.

Figure 9:
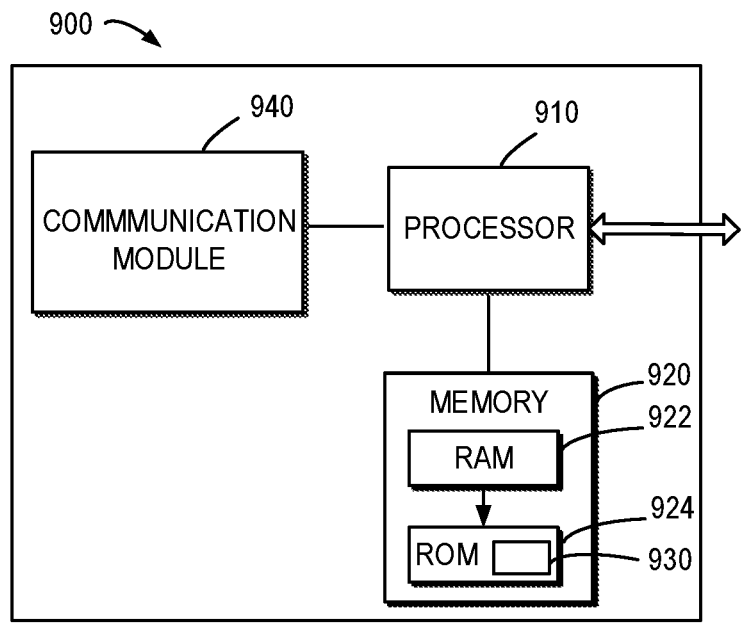
FIG. 9 illustrates a simplified block diagram of an apparatus that is suitable for implementing example embodiments of the present disclosure.

FIG. 9 is a simplified block diagram of a device 900 that is suitable for implementing example embodiments of the present disclosure. The device 900 may be provided to implement a communication device, for example, the first device 110 or the second device 120 as shown in FIGS. 1 and 3. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the memory, e.g., ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIGS. 5 to 8. The example embodiments of the present disclosure may also be implemented by hardware or by a combination of software and hardware.

Figure 10:
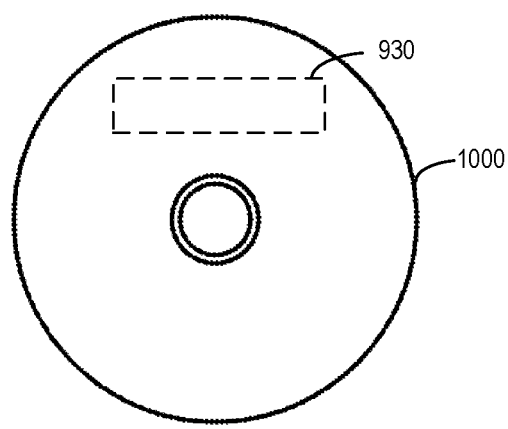
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 which may be in form of CD, DVD or other optical storage disk. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 5 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one non-transitory memory storing instructions that, when executed with the at least one processor, cause the first device to:
   receive, from a second device, configuration information indicating a first plurality of configuration settings associated with a plurality of transmission beams of the second device, the first plurality of configuration settings at least comprising a first plurality of scrambling identifiers;
   in accordance with a determination that a first transmission beam of the plurality of transmission beams is configured for the first device as a serving beam, further determines a first scrambling identifier that is explicitly mapped to the first transition beam according to at least one of a beam index or beam identifier of the first transmission beam; and
   monitor for first control information transmitted by the second device via the first transmission beam using the first scrambling identifier, the first control information indicating presence of data to be transmitted by the second device, wherein the instructions, when executed with the at least one processor, further cause the first device to:
in accordance with a determination that the serving beam is switched from the first transmission beam to a second transmission beam of the plurality of transmission beams, select, from the first plurality of scrambling identifiers, a second scrambling identifier associated with the second transmission beam; and
monitor, based on the second scrambling identifier, for second control information transmitted by the second device via the second transmission beam, the second control information indicating presence of further data to be transmitted by the second device.

2. The device of claim 1, wherein the instructions, when executed with the at least one processor, cause the first device to monitor for the first control information with:
monitoring for the first control information in a discontinuous reception mode.

3. The device of claim 1, wherein the instructions, when executed with the at least one processor, cause the first device to monitor for the second control information with:
receiving, from the second device, update information of updating the second scrambling identifier associated with the second transmission beam to a third scrambling identifier; and
in response to reception of the update information, monitoring for the second control information using the third scrambling identifier.

4. The device of claim 1, wherein the first plurality of configuration settings further comprise a plurality of parameter sets associated with the plurality of transmission beams comprising at least one of the following:
a first plurality of location parameters indicating respective bit locations of a wake-up indication within control information transmitted from the second device via the plurality of transmission beams,
a plurality of dormancy indications applicable to control information transmitted by the second device via the plurality of transmission beams, the plurality of dormancy indications indicating dormancy of at least one secondary cell of the first device outside an on-duration of discontinuous reception,
a plurality of time parameters indicating respective start time points for monitoring control information transmitted from the second device via the plurality of transmission beams, or
a plurality of payload sizes of control information transmitted from the second device via the plurality of transmission beams.

5. The device of claim 4, wherein the instructions, when executed with the at least one processor, cause the first device to monitor for the first control information with:
selecting, from the plurality of parameter sets, a first parameter set associated with the first transmission beam; and
monitoring for the first control information based on the first parameter set.

6. The device of claim 1, wherein the first control information comprises at least one of:
a wake-up indication to indicate whether the first device wakes up or not in an on-duration of discontinuous reception, or
a dormancy indication to indicate dormancy of at least one secondary cell of the first device outside the on-duration of the discontinuous reception.

7. The device of claim 1, wherein the first plurality of scrambling identifiers comprises a plurality of power saving radio network temporary identifiers.

8. The device of claim 1, wherein the configuration information further indicates a second plurality of configuration settings associated with the plurality of transmission beams, the second plurality of configuration settings at least comprising a second plurality of scrambling identifiers; and
wherein the instructions, when executed with the at least one processor, cause the first device to select the first scrambling identifier set with:
receiving, from the second device, information indicating whether the first plurality of configuration settings or the second plurality of configuration settings is applicable for the first device; and
in accordance with a determination that the first plurality of configuration settings is applicable for the first device, selecting the first scrambling identifier from the first plurality of scrambling identifiers.

9. The device of claim 1, wherein the first device comprises a terminal device, and the second device comprises a network device.

10. A second device comprising:
at least one processor; and
at least one non-transitory memory storing instructions that, when executed with the at least one processor, cause the second device to:
transmit, to a first device, configuration information indicating a first plurality of configuration settings associated with a plurality of transmission beams of the second device, the first plurality of configuration settings at least comprising a first plurality of scrambling identifiers;
in accordance with a determination that a first transmission beam of the plurality of transmission beams is configured for the first device as a serving beam, generate first control information with scrambling the first control information with a first scrambling identifier of the first plurality of scrambling identifiers that is explicitly mapped to the first transition bean according to at least one of a beam index or beam identifier of the first transmission beam, the first control information indicating presence of data to be transmitted with the second device; and
transmit the first scrambled control information to the first device via the first transmission beam,
wherein the instructions, when executed with the at least one processor, further cause the second device to:
in accordance with a determination that the serving beam is switched from the first transmission beam to a second transmission beam of the plurality of transmission beams, generate second control information based on a second scrambling identifier of the first plurality of scrambling identifiers associated with the second transmission beam, the second control information indicating presence of further data to be transmitted with the second device; and
transmit the second scrambled control information to the first device via the second transmission beam.

11. The device of claim 10, wherein the instructions, when executed with the at least one processor, cause the second device to generate the first control information with:
in accordance with a determination that the first transmission beam is configured for the first device as the serving beam and a further determination that data is to be transmitted to the first device, scrambling the first control information with the first scrambling identifier.

12. The device of claim 10, wherein the instructions, when executed with the at least one processor, cause the device to generate the second control information with:
  transmitting, to the first device, update information of updating the second scrambling identifier associated with the second transmission beam to a third scrambling identifier; and
  in response to transmission of the update information, scrambling the second control information with the third scrambling identifier.

13. The device of claim 10, wherein the first plurality of configuration settings further comprise a plurality of parameter sets associated with the plurality of transmission beams comprising at least one of the following:
  a first plurality of location parameters indicating respective bit locations of a wake-up indication within control information transmitted from the second device via the plurality of transmission beams,
  a plurality of dormancy indications applicable to control information transmitted with the second device via the plurality of transmission beams, the plurality of dormancy indications indicating dormancy of at least one secondary cell of the first device outside an on-duration of discontinuous reception,
  a plurality of time parameters indicating respective start time points for monitoring control information transmitted from the second device via the plurality of transmission beams, or
  a plurality of payload sizes of control information transmitted from the second device via the plurality of transmission beams.

14. The device of claim 13, wherein the instructions, when executed with the at least one processor, cause the second device to generate the first control information with:
  selecting, from the plurality of parameter sets, a first parameter set associated with the first transmission beam; and
  generating the first control information based on the first parameter set.

15. The device of claim 10, wherein the configuration information further indicates a second plurality of configuration settings associated with the plurality of transmission beams, the second plurality of configuration settings at least comprising a second plurality of scrambling identifiers;
  wherein the instructions, when executed with the at least one processor, further cause the second device to transmit, to the first device, information indicating whether the first plurality of configuration settings or the second plurality of configuration settings is applicable for the first device; and
  wherein the instructions, when executed with the at least one processor, cause the second device to generate first control information with:
  in accordance with a determination that the first plurality of configuration settings is applicable for the first device, selecting the first scrambling identifier from the first plurality of scrambling identifiers.

16. A method comprising:
  receiving, at a first device and from a second device, configuration information indicating a first plurality of configuration settings associated with a plurality of transmission beams of the second device, the first plurality of configuration settings at least comprising a first plurality of scrambling identifiers;
  in accordance with a determination that a first transmission beam of the plurality of transmission beams is configured for the first device as a serving beam, determining a first scrambling identifier that is explicitly mapped to the first transition bean according to at least one of a beam index or beam identifier of the first transmission beam; and
  monitoring for first control information transmitted with the second device via the first transmission beam using the first scrambling identifier, the first control information indicating presence of data to be transmitted with the second device,
  wherein the configuration information further indicates a second plurality of configuration settings associated with the plurality of transmission beams, the second plurality of configuration settings at least comprising a second plurality of scrambling identifiers; and
  in accordance with a determination that the first plurality of configuration settings is applicable for the first device, selecting the first scrambling identifier from the first plurality of scrambling identifiers.

17. The method of claim 16, wherein monitoring for the first control information comprises:
  monitoring for the first control information in a discontinuous reception mode.

18. The method of claim 16, further comprising:
  in accordance with a determination that the serving beam is switched from the first transmission beam to a second transmission beam of the plurality of transmission beams, selecting, from the first plurality of scrambling identifiers, a second scrambling identifier associated with the second transmission beam; and
  monitoring, based on the second scrambling identifier, for second control information transmitted with the second device via the second transmission beam, the second control information indicating presence of further data to be transmitted with the second device.

19. The method of claim 17, wherein monitoring for the second control information comprises:
  receiving, from the second device, update information of updating the second scrambling identifier associated with the second transmission beam to a third scrambling identifier; and
  in response to reception of the update information, monitoring for the second control information using the third scrambling identifier.

20. The method of claim 16, wherein the first plurality of configuration settings further comprise a plurality of parameter sets associated with the plurality of transmission beams comprising at least one of the following:
  a first plurality of location parameters indicating respective bit locations of a wake-up indication within control information transmitted from the second device via the plurality of transmission beams,
  a plurality of dormancy indications applicable to control information transmitted with the second device via the plurality of transmission beams, the plurality of dormancy indications indicating dormancy of at least one secondary cell of the first device outside an on-duration of discontinuous reception,
  a plurality of time parameters indicating respective start time points for monitoring control information transmitted from the second device via the plurality of transmission beams, or
  a plurality of payload sizes of control information transmitted from the second device via the plurality of transmission beams.

21. The method of claim 20, wherein monitoring for the first control information comprises:
    selecting, from the plurality of parameter sets, a first parameter set associated with the first transmission beam; and
    monitoring for the first control information based on the first parameter set.

22. The method of claim 16, wherein the first control information comprises at least one of:
    a wake-up indication to indicate whether the first device wakes up or not in an on-duration of discontinuous reception, or
    a dormancy indication to indicate dormancy of at least one secondary cell of the first device outside the on-duration of the discontinuous reception.

23. The method of claim 16, wherein the first plurality of scrambling identifiers comprises a plurality of power saving-radio network temporary identifiers.

24. A method comprising:
    transmitting, at a second device and to a first device, configuration information indicating a first plurality of configuration settings associated with a plurality of transmission beams of the second device, the first plurality of configuration settings at least comprising a first plurality of scrambling identifiers;
    in accordance with a determination that a first transmission beam of the plurality of transmission beams is configured for the first device as a serving beam, generating first control information with scrambling the first control information with a first scrambling identifier of the first plurality of scrambling identifiers that is explicitly mapped to the first transition bean according to at least one of a beam index or beam identifier of the first transmission beam, the first control information indicating presence of data to be transmitted with the second device; and
    transmitting the first scrambled control information to the first device via the first transmission beam,
    wherein the configuration information further indicates a second plurality of configuration settings associated with the plurality of transmission beams, the second plurality of configuration settings at least comprising a second plurality of scrambling identifiers;
    wherein the method further comprises: transmitting, to the first device, information indicating whether the first plurality of configuration settings or the second plurality of configuration settings is applicable for the first device; and
    wherein generating first control information comprises in accordance with a determination that the first plurality of configuration settings is applicable for the first device, selecting the first scrambling identifier from the first plurality of scrambling identifiers.

25. The method of claim 24, wherein generating the first control information comprises:
    in accordance with a determination that the first transmission beam is configured for the first device as the serving beam and a further determination that data is to be transmitted to the first device, scrambling the first control information with the first scrambling identifier.

26. The method of claim 24, further comprising:
    in accordance with a determination that the serving beam is switched from the first transmission beam to a second transmission beam of the plurality of transmission beams, generating second control information based on a second scrambling identifier of the first plurality of scrambling identifiers associated with the second transmission beam, the second control information indicating presence of further data to be transmitted with the second device; and
    transmitting the second scrambled control information to the first device via the second transmission beam.

27. The method of claim 26, wherein generating the second control information comprises:
    transmitting, to the first device, update information of updating the second scrambling identifier associated with the second transmission beam to a third scrambling identifier; and
    in response to transmission of the update information, scrambling the second control information with the third scrambling identifier.

28. The method of claim 24, wherein the first plurality of configuration settings further comprise a plurality of parameter sets associated with the plurality of transmission beams comprising at least one of the following:
    a first plurality of location parameters indicating respective bit locations of a wake-up indication within control information transmitted from the second device via the plurality of transmission beams,
    a plurality of dormancy indications applicable to control information transmitted with the second device via the plurality of transmission beams, the plurality of dormancy indications indicating dormancy of at least one secondary cell of the first device outside an on-duration of discontinuous reception,
    a plurality of time parameters indicating respective start time points for monitoring control information transmitted from the second device via the plurality of transmission beams, or
    a plurality of payload sizes of control information transmitted from the second device via the plurality of transmission beams.

29. The method of claim 28, wherein generating the first control information comprises:
    selecting, from the plurality of parameter sets, a first parameter set associated with the first transmission beam; and
    generating the first control information based on the first parameter set.

30. A non-transitory program storage device readable by an apparatus, tangibly embodying a program of instructions executable with the apparatus for performing operations, the operations comprising the method as claimed in claim 16.

31. A non-transitory program storage device readable by an apparatus, tangibly embodying a program of instructions executable with the apparatus for performing operations, the operations comprising the method as claimed in claim 24.

* * * * *